United States Patent
Faruque et al.

(10) Patent No.: US 6,198,719 B1
(45) Date of Patent: Mar. 6, 2001

(54) BI-ORTHOGONAL CODE DIVISION MULTIPLE ACCESS SYSTEM

(75) Inventors: Saleh Faruque; Wing Lo; Payam Maveddat, all of Plano, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/032,183

(22) Filed: Feb. 27, 1998

(51) Int. Cl.[7] .................................................. H04J 11/00
(52) U.S. Cl. ..................... 370/209; 370/206; 370/320; 370/335; 370/342; 370/441; 375/260; 375/308; 375/329
(58) Field of Search ..................... 370/206, 208, 370/209, 319, 320, 335, 337, 342, 344, 347, 441, 445, 203; 455/403, 456; 375/235, 260, 261, 269, 279, 329, 308

(56) References Cited

U.S. PATENT DOCUMENTS

| 5,353,352 | * 10/1994 | Dent et al. | 370/209 |
| 5,550,809 | * 8/1996 | Bottomley et al. | 370/209 |
| 5,675,344 | * 10/1997 | Tong et al. | 455/456 |

* cited by examiner

*Primary Examiner*—Douglas W. Olms
*Assistant Examiner*—Shick Hom
(74) *Attorney, Agent, or Firm*—John D. Crane

(57) ABSTRACT

The present invention assigns a pair of user ID's to each user. The user ID's are used as addresses to access two orthogonal Walsh codes in a memory. Each Walsh code is $2^n$-bits in length and the memory size is $2^n \times 2^n$. The orthogonal codes are then used to cover the information symbols for transmission. This results in the transmitted signal being orthogonal to other users and also orthogonal within the transmitting user's own signal bursts.

4 Claims, 4 Drawing Sheets

BI-ORTHOGONAL CODE DIVISION MULTIPLE ACCESS SYSTEM

BACKGROUND OF THE INVENTION

I. Field of the Invention

The present invention relates to radio communications. More particularly, the present invention relates to mobile communication in a code division multiple access system.

II. Description of the Related Art

Multiple access techniques are designed to make efficient use of the limited radio frequency spectrum. They allow users to access the same band of frequency without interfering with each other. Examples of such techniques include time division multiple access (TDMA), frequency division multiple access (FDMA), and code division multiple access (CDMA).

CDMA wireless technology, governed by Electronic Industry Association/Telecommunication Industry Association Interim Specification-95 (IS-95), employs a spread spectrum technique for the transmission of information. A spread spectrum system uses a modulation technique that spreads the transmitted signal over a wide frequency band. This frequency band is typically substantially wider than the minimum bandwidth required to transmit the signal.

A form of frequency diversity is obtained by spreading the transmitted signal over a wide frequency range. Since only part of a signal is typically affected by a frequency selective fade, the remaining spectrum of the transmitted signal is unaffected. A receiver that receives the spread spectrum signal, therefore, is affected less by the fade condition than a receiver using other types of signals.

The spread spectrum technique is accomplished by modulating each base band data signal to be transmitted with a unique wide band spreading code. Using this technique, a signal having a bandwidth of only a few kilohertz can be spread over a bandwidth of more than a megahertz. Typical examples of spread spectrum techniques are found in M.K. Simon; *Spread Spectrum Communications*, Volume I, pp. 262–358 McGraw-Hill (1994).

In a CDMA-type radiotelephone system, multiple signals are transmitted simultaneously on the same frequency. A particular receiver determines which signal is intended for that receiver by the unique, orthogonal spreading code, referred to as a Walsh code, in each signal. The signals at that frequency, without the particular spreading code intended for that particular receiver, appear to be noise to that receiver and are ignored.

The demand for reduced error transmission has been on the rise in recent years. New wireless services have emerged recently, such as broad band multimedia communications, that require lower bit error rates. Multimedia applications may require bit error rates (BER) as low as $10^{-10}$.

Convolutional encoding and RS code with appropriate interleaver depth are presently used to reduce the BER. However, more robust multiple access radio communications for both broad band terrestrial applications as well as satellite communications are needed.

SUMMARY OF THE INVENTION

The present invention encompasses a method for transmitting a code division multiple access signal in a radiotelephone system. The system is comprised of a radiotelephone that communicates with a base station. The radiotelephone is assigned user identification codes by the base station that are unique from other radiotelephone user identification codes. In the preferred embodiment, the radiotelephone is assigned two unique codes.

The transmitter in the base station generates a plurality of Walsh codes using the unique user identifications. In the preferred embodiment, two Walsh codes are generated. Each Walsh code is orthogonal to the other Walsh code generated in that particular radiotelephone. Additionally, both Walsh codes are orthogonal to the Walsh codes used by any other radiotelephones in the system.

The two Walsh codes are used to cover an information signal to be transmitted from the base station to the radiotelephone. This information signal can be digitized voice data, video data, or any other type of digitized information.

The covered information signal is then modulated for transmission. In the preferred embodiment, quadrature phase shift keying modulation is used. The resulting modulated signal is orthogonal to other signals transmitted by the radiotelephone and to all other communication signals in the radiotelephone system.

Since the cross correlation of Walsh codes is zero, the present invention lowers the symbol error rate of the system and increases system capacity. Data transmission using the present invention results in a bit error rate less than $10^{-10}$ at $E_b/N_o = 4.5$ dB. In other words, complex error correction normally required in a radio system is not needed using the present invention.

In the preferred embodiment, the base station of the present invention is a satellite that communicates with terrestrial radiotelephones able to receive satellite signals. In alternate embodiments, the present invention is used in terrestrial base stations.

DETAILED DESCRIPTION OF THE PREFERRED EMBODIMENT

The bi-orthogonal process and apparatus of the present invention is a multiple access technique that assigns two orthogonal codes to users. These codes represent logical 1's and 0's. This permits orthogonality in two dimensions, between each user in a communication system and within any user's own signal bursts.

Figure 1:
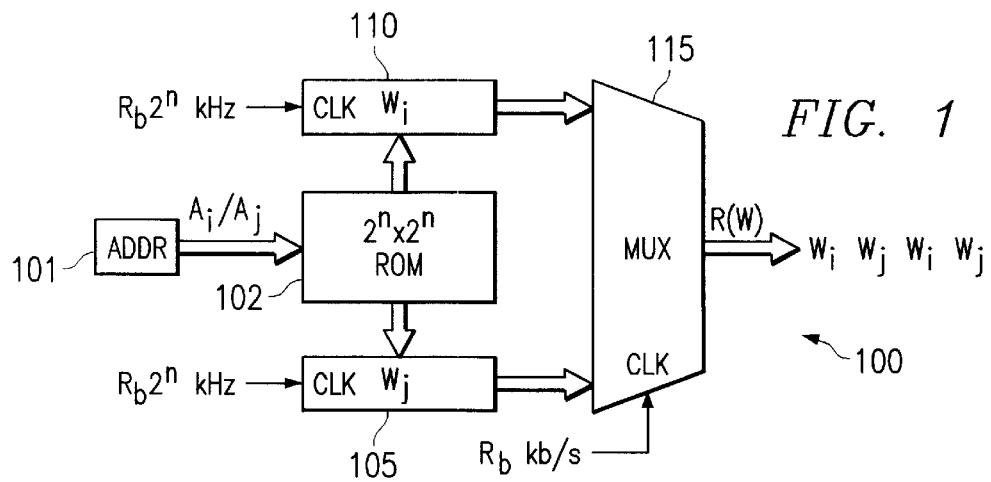
FIG. 1 shows a flow diagram of the bi-orthogonal Walsh code generation apparatus of the present invention.

FIG. 1 illustrates a diagram of the Walsh code generating apparatus of the present invention. In the preferred embodiment, a pair of n-bit user identifications (ID's) or addresses is transmitted from the base station to the radiotelephone over a paging channel. The user ID's uniquely identify the radiotelephone to the system. As is well known in the CDMA art, each radiotelephone recognizes only those received signals that have been covered by Walsh codes generated by those particular user ID's.

In the preferred embodiment, the n-bit addresses are 7 bits each. Alternate embodiments use other address lengths.

The user ID's are used as the n-bit addresses, $A_i/A_j$, to the $2^n \times 2^n$ bit read only memory (ROM) (102). The ROM (102) contains the 128 Walsh codes used in the radiotelephone system. Other embodiments use other forms and sizes of memory to store the Walsh codes. These can include non-volatile RAM, PROM, and EPROM. The size of the memory required is based on the length of the address or user ID used.

In the preferred embodiment, the ROM (102) is a dual output ROM that outputs each of the two unique Walsh codes in response to the address. This can be accomplished either simultaneously or in rapid succession. An alternate embodiment uses two separate ROM's, each ROM using one of the two received addresses.

Each output Walsh code is input to a separate parallel to serial shift register (105 and 110). In the embodiment of FIG. 1, $W_i$ is latched into one shift register (110) while $W_j$ is latched into the other (105). Each Walsh code is then clocked out serially to a multiplexer (115).

The Walsh codes are clocked out of the shift registers at a clock rate of $R_b 2^n$ kHz. $R_b$ is the bit rate of the input data, n is the number of address bits, and $2^n$ is the length of the Walsh code. In the preferred embodiment, $R_b$ is a non-return to zero information stream at 9.6 kbps, n is seven address bits, and the Walsh code is 128 bits long. Alternate embodiments use other values.

The multiplexer (115) chooses first one, $W_i$, and then the other Walsh code, $W_j$, to be output from the multiplexer in a serial data stream, R(W). The multiplexer (115) is clocked at a rate of $R_b$ kbps, the same as the data input rate. The modulating signal, R(W), also known as symbols, has a rate of $R_b 2^n$ kbps.

In the preferred embodiment, the input signal, $R_b$, is a low speed NRZ data signal having a narrow power spectrum. The output of the ROM is a high speed Walsh code where each code represents a block of $2^n$-bit data. The power spectral density of the Walsh code depends on the length of the address register and input bit rate. For example, if $R_b$=9.6 kbps and n=7, then R(W)=1.2288 M symbols/second (sps). This implies that for a given information rate, the speed of the modulating signal can be chosen simply by adjusting the length of the address register. This also determines the size of the ROM.

The bi-orthogonal Walsh code generator apparatus (100) of the present invention may be implemented in different ways. For example, an alternate embodiment may use a digital signal processor to perform all the tasks of addressing, parallel-to-serial shifting, clocking, and multiplexing as illustrated by separate blocks in FIG. 1.

The output of the bi-orthogonal Walsh code generator (100) of the present invention is used in a similar manner to the orthogonal spreading codes used in a CDMA radiotelephone system. An example of such a use is illustrated in FIG. 3.

Figure 3:
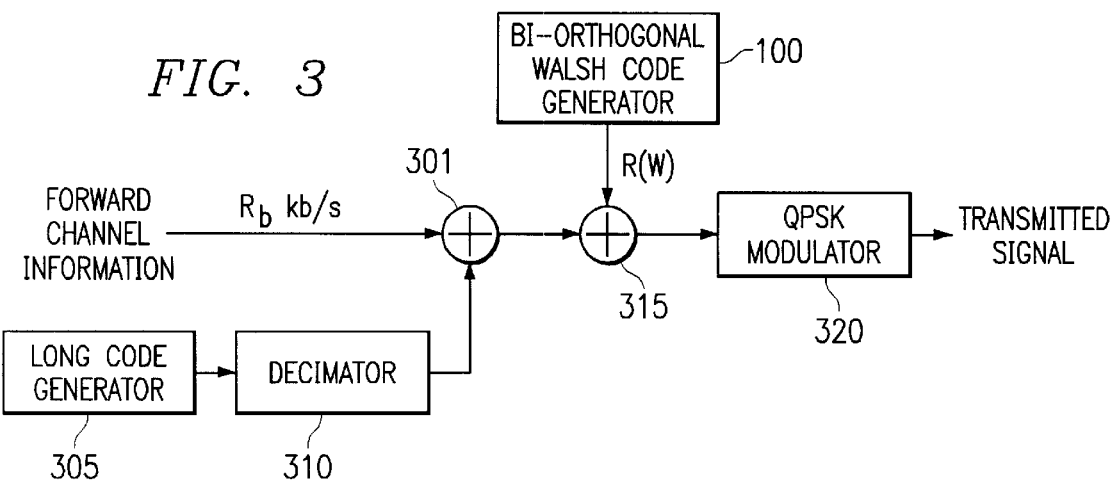
FIG. 3 shows a flow diagram of the preferred embodiment use of the bi-orthogonal Walsh code generation apparatus of FIG. 1.

FIG. 3 illustrates the use of the bi-orthogonal Walsh code generator (100) in a base station. In this embodiment, the forward channel information is combined (301) with a long code (305) that has been decimated (310). The combined forward channel information is then combined (315) with the bi-orthogonal Walsh codes from the Walsh code generator (100).

The covered symbols that results from combining the bi-orthogonal Walsh codes with the information signal is then quadriphase shift keying (QPSK) modulated (320). The modulated signal is then transmitted to the radiotelephone for processing.

QPSK modulation in a CDMA environment is well known in the art. A more detailed explanation of this modulation technique is available in Andrew J. Viterbi, CDMA: *Priniciples of Spread Spectrum Communication*, Chap. 2, (1995).

Figure 2:
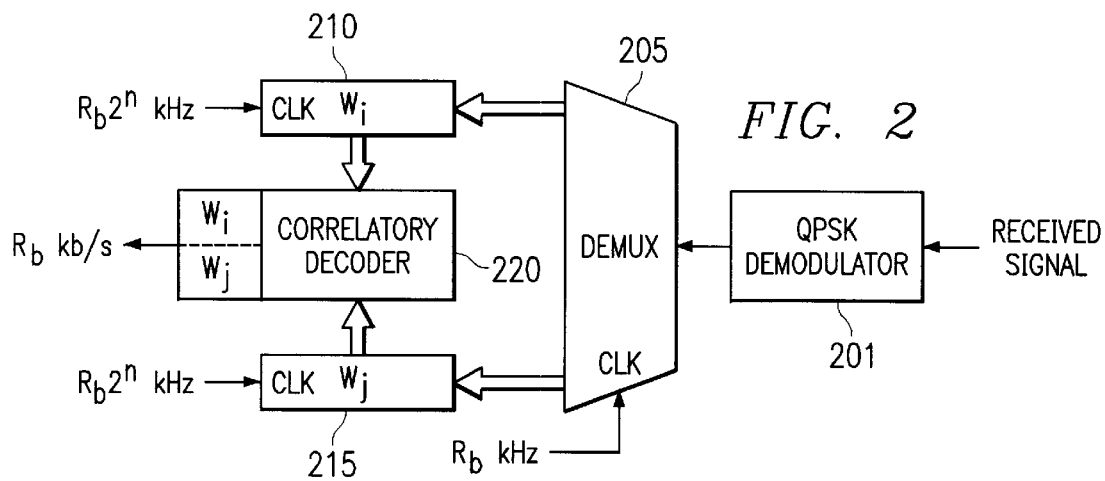
FIG. 2 shows a flow diagram of the bi-orthogonal CDMA demodulation and decoding apparatus of the present invention.

FIG. 2 illustrates a bi-orthogonal demodulation and decoding apparatus in accordance with the present invention. Such an apparatus is found in either the radiotelephone or the base station for demodulation, correlation, and decoding of the received symbols.

The received signal is QPSK demodulated (201) and input to a demultiplexer (205) to sort out the two orthogonal Walsh codes. The QPSK demodulation process is well known in the art. A more detailed description of QPSK demodulation is available in Andrew J. Viterbi, CDMA: *Principles of Spread Spectrum Communication*, Chap. 4, (1995).

The two separate Walsh codes, $W_i$ and $W_j$, are each input to respective serial to parallel shift registers (210 and 215). The Walsh codes are then input to a correlator and decoder (220). This block performs the orthogonal decoding process of data recovery from the impaired $W_i$ and $W_j$.

The incoming impaired Walsh codes are examined for correlation with one of the $2^n$ bit Walsh codes stored in the ROM (102) illustrated in FIG. 1. The correlation process returns the nearest Walsh code to each impaired Walsh code. The decoder then translates the nearest Walsh code into a decimal number that corresponds to the desired information. As is well known in the art, if the Walsh codes correspond to the expected Walsh codes, the received signal is processed. If the Walsh codes are not what were expected, the received signal is regarded as noise and ignored.

Since the modulated signal is transmitted over a radio channel, the propagated signal is subject to impairment due to noise, interference, and fading. This results in a symbol error rate (SER). If the SER exceeds a certain threshold, the decoder selects a wrong Walsh code. The tolerance of symbol errors for a given code, therefore, depends on the length of the orthogonal code ($2^n$), the length of the address register (n), and the distance between two orthogonal codes ($2^n/2$). This concept is illustrated in FIG. 4.

Figure 4:
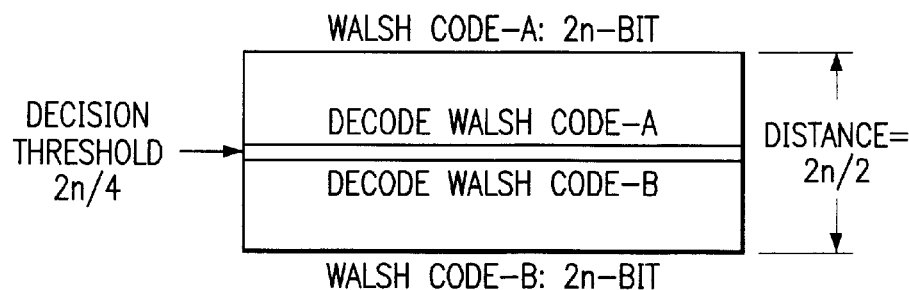
FIG. 4 shows a Walsh code decoding rule used in the present invention.

FIG. 4 shows a decision threshold set midway between the two orthogonal codes. Since an orthogonal code has an equal number of 1's and 0's, a $2^n$-bit orthogonal code has $2^n/2$ 1's and $2^n/2$ 0's. The distance between two orthogonal codes is also $2^n/2$ and therefore the decision threshold is $2^n/4$.

Thus, if the number of symbol errors $\geq 2^n/4$, a false detection takes place and the number of symbols errors $\geq 2^n/4$. The symbol error threshold for a false detection is therefore $2^n/4$.

The decision criterion for a valid Walsh code is that the $2^n$-bit comparison must yield $\leq (2^n/4)-1$ errors. These errors may occur in any order. Consequently, the Walsh code Error Probability P(W) follows the formulation of Bernoulli trials:

$$P(W) = \sum_{i=(2^n/4)+1}^{2^n} \binom{2^n}{i} (1-P_e)^{2^n-1} P_e^i$$

where $P_e$ is the symbol error rate.

With QPSK modulation and non-coherent detection, $P_e$ can be estimated, in additive white Gaussian noise, as:

$$P_e = \frac{1}{\sqrt{\pi}} \exp\left(-\frac{E_b}{N_o}\right).$$

Figure 5:
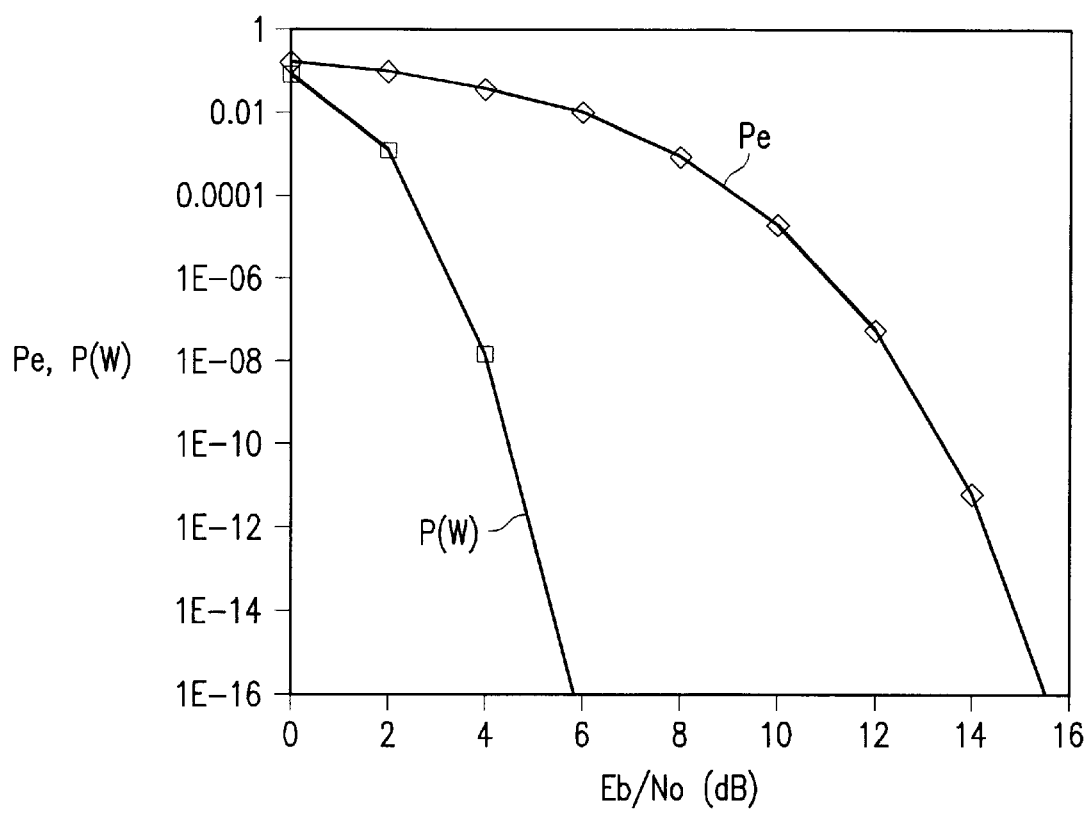
FIG. 5 shows a plot of Pe and P(W) versus $E_b/N_o$.

In FIG. 5, $P_e$ and P(W) are plotted as a function of $E_b/N_o$. It can be seen from this plot that as the symbol error rate approaches 0.25, the Walsh code error rate also approaches 0.25. At this point, the probability of accepting true Walsh code equals the probability of rejecting the false Walsh code, which equals 0.5. This implies that as long as $P(W) \leq 0.25$, the correlator will always detect the valid Walsh code that corresponds to the error free information.

To illustrate the gain in system capacity using the present invention, it is well known in the art that capacity (N), the number of simultaneous users, is given by:

$$N = 1 + \frac{G_s}{\frac{E_b}{N_o}} \cdot C$$

where C is an arbitrary constant that depends on voice activity factors, frequency reuse, sectorization, and soft hand-off. $G_s$ is defined as:

$$G_s = 10 \log\left(\frac{R_w}{R_b}\right)$$

where $R_W$ is the rate of the Walsh code and $R_b$ is the rate of the input signal. For orthogonal CDMA with $R_W = R_b 2^n$, $G_s$ becomes:

$$G_s = 10 \log 2^n.$$

The $E_b/N_o$ requirements are low for the radiotelephone system of the present invention due to the symbol error rate. Therefore, from the above equation for capacity, a system using the present invention experiences higher capacity.

Figure 6:
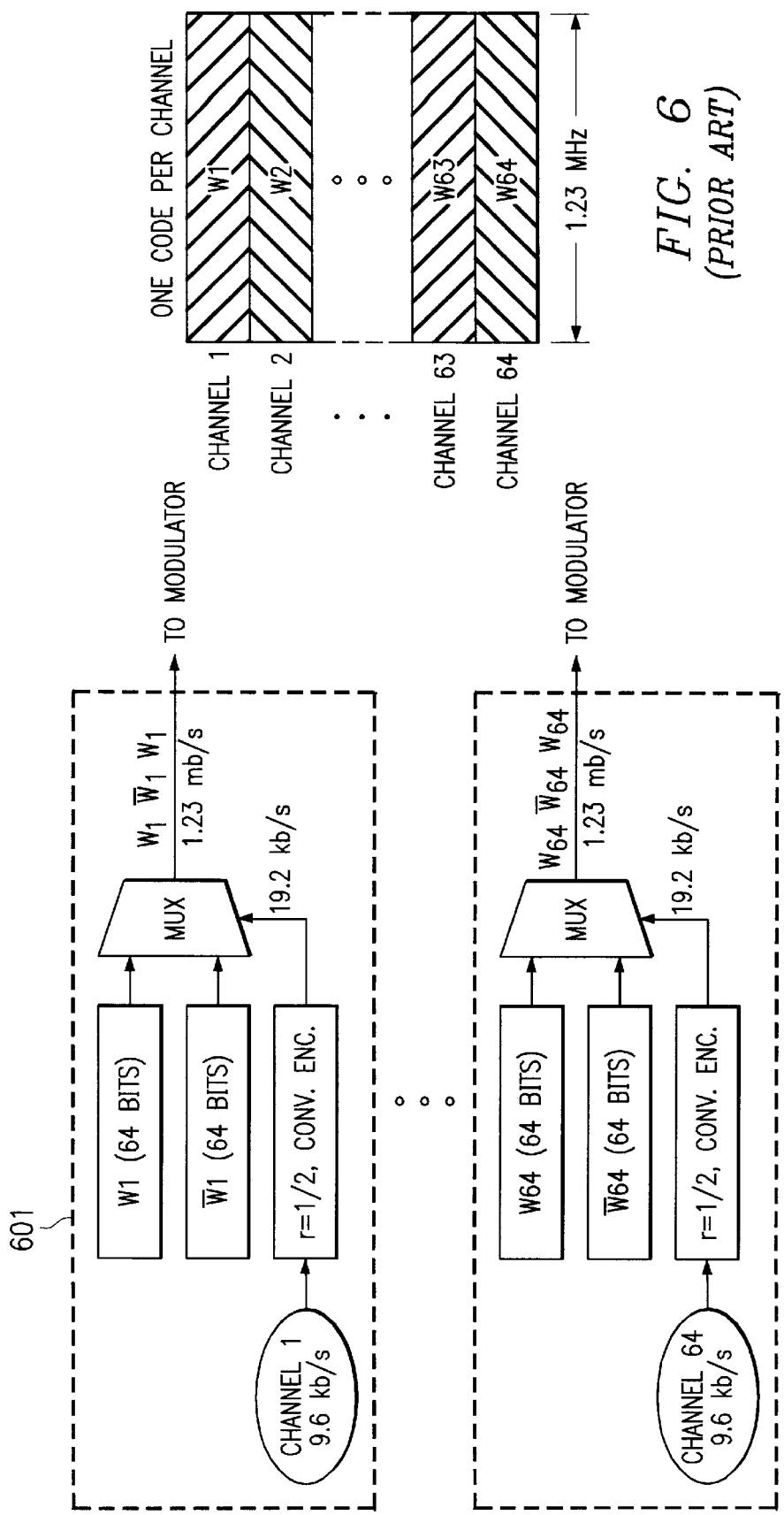
FIG. 6 shows a prior art representation of a system using a single orthogonal Walsh code.
Figure 7:
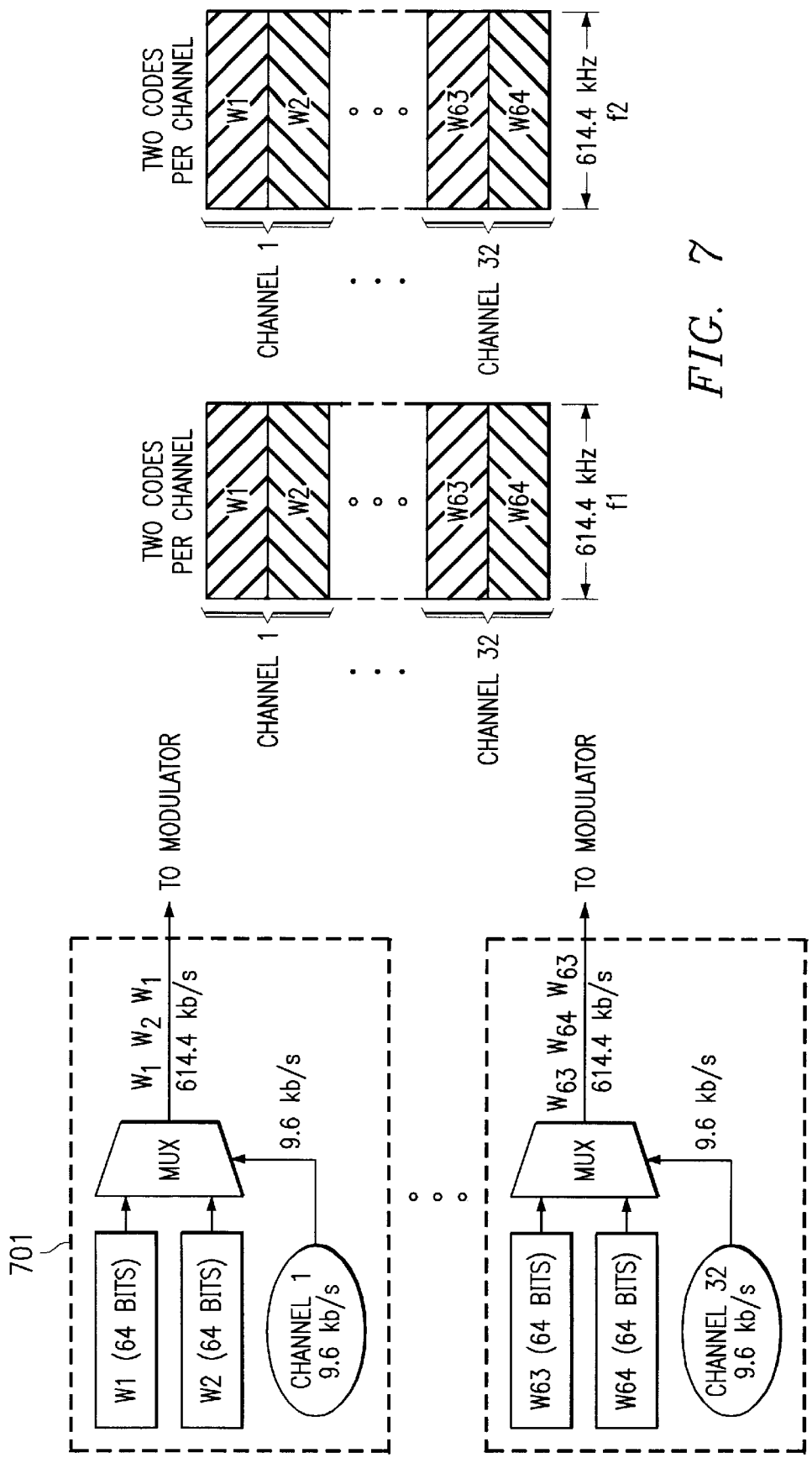
FIG. 7 shows a representation of the bi-orthogonal Walsh code system of the present invention.

As another illustration of the benefits of the present invention, FIGS. 6 and 7 compare a representation of the prior art to that of the present invention. The prior art system is a system that adheres to the CDMA specification IS-95.

FIG. 6 illustrates the prior art IS-95 representation of a single, orthogonal Walsh code system. This figure shows that the system has 64 different Walsh codes with each Walsh code being 64 bits in length.

The Walsh code generation apparatus (601) generates a single Walsh code for each channel. In this example, the Walsh codes are labeled $W_1$–$W_{64}$. The Walsh code is then transmitted in a continuous stream with its complement, $\overline{W}_1$–$\overline{W}_{64}$.

FIG. 7 illustrates a representation of the bi-orthogonal Walsh code system of the present invention. In this embodiment, the Walsh code generation apparatus (701) generates two Walsh codes for each channel. Each code is orthogonal to the other codes. These codes are then transmitted in a continuous symbol stream.

The transmission bandwidth using the present invention has been reduced 50% from the 64 channels of the prior art to 32 channels. This is accomplished without any loss in RF capacity.

The preferred embodiment of the present invention uses two orthogonal Walsh codes. Alternate embodiments use other quantities of orthogonal Walsh codes. For example, if four addresses or user ID's are used, four orthogonal Walsh codes can be generated. Additional alternate embodiments generate eight or sixteen Walsh codes. However, using more Walsh codes reduces the spectrum.

In all of the alternate embodiments, each Walsh code is orthogonal with the other Walsh codes generated by the unique user ID's assigned to a particular radiotelephone. Additionally, the Walsh codes for that particular radiotelephone are orthogonal to Walsh codes assigned to other radiotelephones in a particular system.

The preferred embodiment of the present invention is used in a satellite-based application. In this case, the base station is the satellite while the radiotelephone has the capability to communicate with the satellite over the appropriate frequency spectrum. Alternate embodiments use the present invention in a terrestrial cellular radiotelephone system, a home-based communication system, or a building-based communication system.

In summary, since the cross-correlation of Walsh codes is zero, the apparatus and process of the present invention guarantees data transmission with a bit error rate $\leq 10^{-10}$ at $E_b/N_o = 4.5$ dB. Moreover, the system capacity is also enhanced due to the low $E_b/N_o$. Since orthogonal codes are also used for spectrum spreading, the process of the present invention enables spreading, coding, and user isolation in one platform.

We claim:

1. A bi-orthogonal base station apparatus for communicating in a code division multiple access system, the system comprising a radiotelephone communicating with a plurality of base stations over a channel, the apparatus comprising:

a memory that stores a plurality of $2^n$-bit Walsh codes, the memory coupled to and addressed by two n-bit addresses such that a first Walsh code and a second Walsh code, orthogonal to the first Walsh code, are output from the memory, both the first and second Walsh codes being orthogonal to any other system Walsh codes;

a first shift register, coupled to the memory, for receiving the first Walsh code in a parallel format and shifting out the first Walsh code in a serial format;

a second shift register, coupled to the memory, for receiving the second Walsh code in the parallel format and shifting out the second Walsh code in the serial format;

a multiplexer, coupled to the first and second shift registers, for integrating the first and second Walsh codes into a single serial bit stream; and a quadrature phase shift keying modulator, coupled to the multiplexer, for modulating the serial bit stream for transmission over the channel.

2. The apparatus of claim 1 wherein the first and second shift registers are clocked at a frequency of $R_b(2^n)$ kHz where $R_b$ is an input bit rate and $2^n$ is a length of the first and second Walsh codes.

3. The apparatus of claim 1 wherein the multiplexer is clocked at a frequency equal to an input bit rate.

4. A bi-orthogonal data recovery apparatus for communicating in a code division multiple access system, the apparatus comprising:

a receiver for receiving a modulated data stream comprising a first and a second Walsh code, the first Walsh code orthogonal to the second Walsh code, both Walsh codes being orthogonal to any other code division multiple access system Walsh codes;

a demodulator, coupled to the receiver, for demodulating the modulated data stream;

a demultiplexer, coupled to the demodulator, for splitting the demodulated data stream into separate paths for the first and the second Walsh codes;

a first shift register, coupled to the demultiplexer, for serially shifting in the first Walsh code and outputting the first Walsh code in a parallel form;

a second shift register, coupled to the demultiplexer, for serially shifting in the second Walsh code and outputting the second Walsh code in the parallel form, a memory, coupled to the demodulator, for storing a plurality of $2^n$-bit Walsh codes; and a correlator, coupled to the memory and the first and second shift registers, for comparing the plurality of stored $2^n$-bit Walsh codes to the received first and second Walsh codes to determine a nearest Walsh code to each of the received first and second Walsh codes.

* * * * *